United States Patent [19]

Lu

[11] Patent Number: 6,052,462

[45] Date of Patent: Apr. 18, 2000

[54] DOUBLE TALK DETECTION AND ECHO CONTROL CIRCUIT

[75] Inventor: Youhong Lu, Sterling, Va.

[73] Assignee: Tellabs Operations, Inc., Lisle, Ill.

[21] Appl. No.: 08/890,923

[22] Filed: Jul. 10, 1997

[51] Int. Cl.[7] .................................................... H04M 1/58
[52] U.S. Cl. ............................ 379/410; 379/411; 379/406
[58] Field of Search .................................... 379/411, 410, 379/406

[56] References Cited

U.S. PATENT DOCUMENTS

| | | |
|---|---|---|
| 3,935,403 | 1/1976 | Penicaud et al. . |
| 4,177,361 | 12/1979 | Birck . |
| 4,670,903 | 6/1987 | Araseki et al. ........................ 379/411 |
| 4,747,132 | 5/1988 | Ibaraki et al. . |
| 4,852,081 | 7/1989 | Bonnet et al. . |
| 4,891,801 | 1/1990 | Marcos et al. . |
| 4,903,247 | 2/1990 | Van Gerwen et al. . |
| 4,965,822 | 10/1990 | Williams . |
| 5,014,263 | 5/1991 | Vairavan et al. . |
| 5,151,937 | 9/1992 | Chujo et al. . |
| 5,164,989 | 11/1992 | Brandman et al. . |
| 5,317,596 | 5/1994 | Ho et al. ................................. 375/14 |
| 5,319,636 | 6/1994 | Long et al. . |
| 5,390,250 | 2/1995 | Janse et al. . |
| 5,463,618 | 10/1995 | Furukawa et al. . |
| 5,535,194 | 7/1996 | Ashley et al. . |

*Primary Examiner*—Forester W. Isen
*Assistant Examiner*—Brian Pendleton
*Attorney, Agent, or Firm*—Dann, Dorfman, Herrell & Skillman

[57] ABSTRACT

In a full duplex audio telecommunication system, it is desirable to determine whether a transmitted signal contains a signal component generated exclusively at one end of the communication path. A removal filter is connected to receive a Far-End signal and to remove a signal component therefrom. A detection filter is connected to receive a Near-End signal and to detect the presence of a signal component corresponding to the component removed from the Far-End signal. A decision stage connected with the detection filter responds to the detection filter by actuating a control signal when signal activity in the selected signal component is detected. The control signal is used to control adaption of an AFIR filter of an echo canceler to prevent adaption during intervals of Near-End speech activity. The selected signal component preferably comprises a predetermined frequency range.

20 Claims, 1 Drawing Sheet

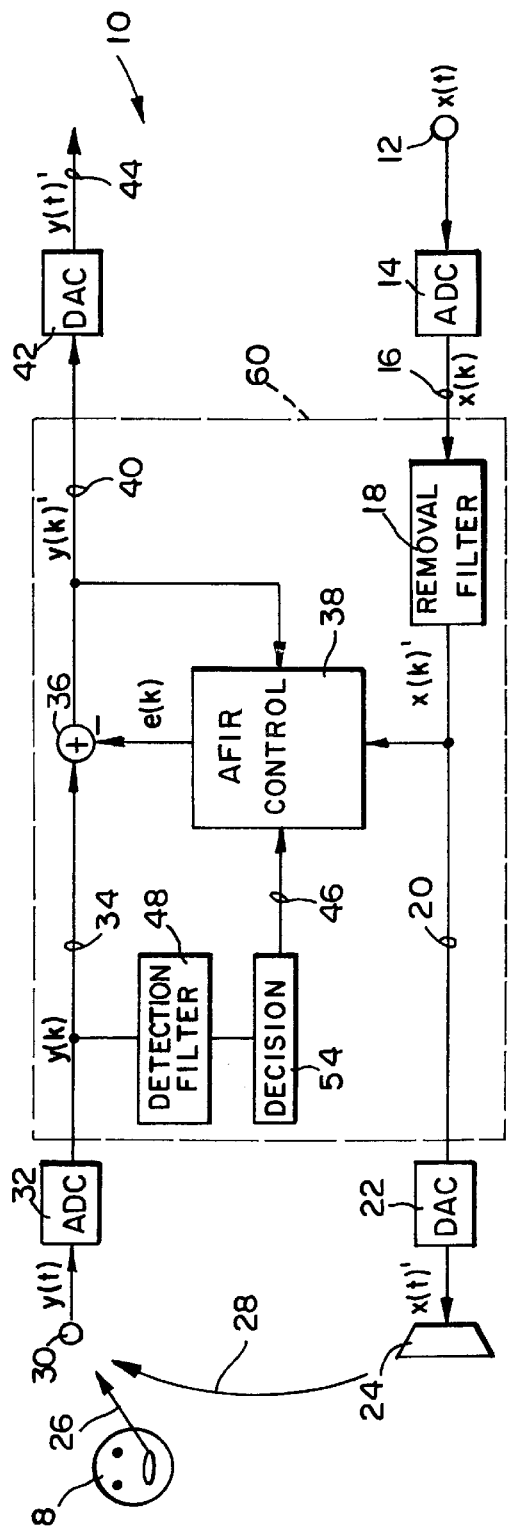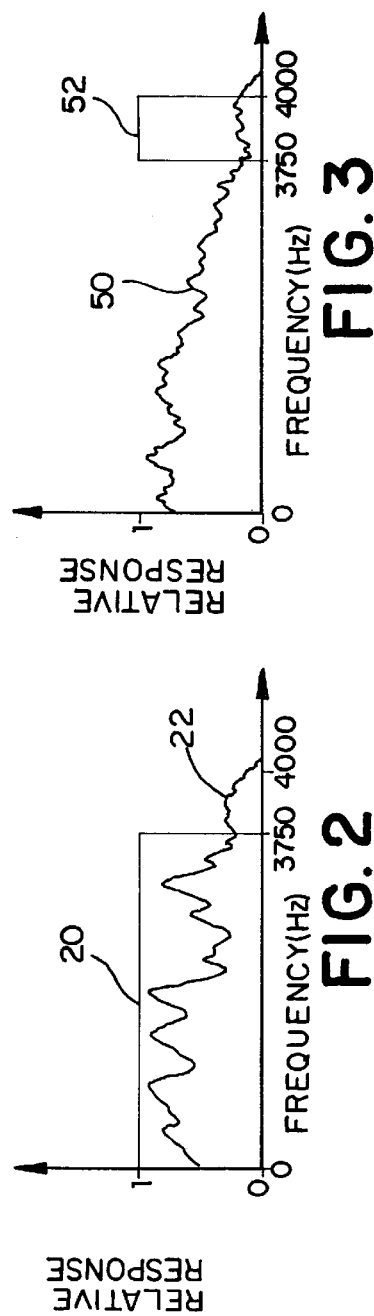

DOUBLE TALK DETECTION AND ECHO CONTROL CIRCUIT

FIELD OF THE INVENTION

This invention relates to full duplex telecommunication systems. More particularly, the present invention relates to a device that improves double talk detection in a "hands-free" teleconferencing system.

BACKGROUND OF THE INVENTION

Electronic communication systems have become essential in the Information Age. Teleconferencing, mobile communications, and Internet technology have evolved from costly technological conveniences to necessary tools of modern communication and commerce. One communication tool increasingly exploited for its versatility and flexibility is the teleconferencing terminal. Teleconferencing has enjoyed widespread application in both personal and commercial communication contexts. The ability for several individuals at a Far-End location to participate in group discussions with several individuals at a Near-End location, has proved to be particularly valuable.

A speakerphone, which includes a speaker and microphone sections, is often integrated with a traditional telephone terminal to obviate the need for the traditional handset. The speaker and microphone of the speakerphone enable "hands free" operation, thereby making the telephone terminal available for use by all parties within range of the speaker and microphone. Due to the close proximity of the speaker and the microphone, it is necessary to employ circuitry for preventing the microphone from re-transmitting received audio signals produced by the speaker. Such re-transmission would otherwise cause undesirable echoes or sustained feedback oscillations. Some teleconferencing systems employ analog voice switching or echo suppression circuits. These circuits disable, or substantially attenuate, one of the respective send and receive telecommunication channels in favor of the other. One result of that type of echo suppression is undesirable clipping of voice signals during a conversation. Additionally, background noises are often completely muted during pauses in the conversation. Such muting can be undesirably perceived as disconnection of the call.

Digital adaptive echo cancellation technology has been developed as a favorable alternative to echo suppression. Adaptive echo cancellation techniques require digital signal analysis. The Far-End analog signal is converted to a digital signal, processed and then re-converted to an analog signal for output to the speaker. The microphone signal is similarly converted for digital processing. In the echo canceler, an estimated echo signal is produced by a digital filter and then subtracted from the microphone signal.

The filter used in the echo canceler to produce the estimated echo signal is an Adaptive Finite Impulse Response (AFIR) digital filter. The AFIR filter performs this function by convolving the received Far-End signal with internal coefficient values. The internal coefficient values are updated during a telephone conversation by an error correlation procedure, such that when the estimated echo signal is combined with the Near-End signal the echo signal is effectively canceled electronically. In order to ensure that the internal coefficient values are accurately updated, it is necessary to perform the error correlation procedure during periods of the conversation when only the Far-End participant is speaking. If the microphone signal contains a Near-End speech component, then the echo canceler will adapt the internal coefficients of the AFIR filter to attempt to cancel the Near-End speech as well as any reflected Far-End speech.

Known echo cancelers incorporate "double talk" detection circuits to identify conditions where both the Near-End and Far-End participants are speaking and to suspend AFIR coefficient adaptation when such conditions exist. The known detection circuits perform a comparison of the average energy of the loudspeaker signal to the average energy of the microphone signal. If the microphone signal level exceeds a predetermined proportion of loudspeaker signal, then adaptation within the digital filter is suspended. However, such double talk detection circuits are known to make incorrect determinations due to sharp changes in echo path response, changes in speaker volume, and the time varying properties of signals, among other factors.

In view of the state of art as described above, a double talk detection technique is desired which is capable of accurately distinguishing between a Near-End speech signal transmission and an echo signal, in order to effect echo cancellation or suppression more accurately and reliably.

SUMMARY OF THE INVENTION

A double talk detection system is provided for connection between a Near-End and Far-End path of a telecommunication terminal. A first filter is connected to the Far-End receive path for removing a selected component from the Far-End signal prior to providing the Far-End signal to the audio output device of the terminal. A second filter is connected with the audio input device of the terminal for detecting a component of the Near-End signal corresponding to the component removed from the Far-End signal. The double talk detection system determines that Near-End speech is present in the Near-End signal of the selected signal component is present in the Near-End signal.

In a preferred embodiment, the first filter comprises an attenuating filter for removing a range of frequencies from the Far-End signal. The second filter comprises a bandpass filter and a detector for detecting the presence of the range of frequencies within the Near-End signal. The presence of the range of frequencies within the Near-End signal indicates that Near-End speech is present, because such signal components are removed from the Far-End signal and therefore, could only have been generated at the Near-End.

The double talk detection system further comprises a control output terminal for signalling that Near-End speech has been detected. The control output terminal is connected to a control input of the echo canceler in order to suspend adaptation of the internal coefficients of the AFIR filter when a Near-End speech signal is detected.

Other aspects the present invention will become apparent to those skilled in the art upon reading and understanding the following detailed specification and attached drawings.

BRIEF DESCRIPTION OF THE DRAWINGS

FIG. 1 is a functional block diagram of a teleconferencing terminal incorporating the double talk detection system of the present invention;

FIG. 2 is a graph showing the frequency response characteristic of a first filter of the double talk detection system of FIG. 1, superimposed on the frequency spectrum of a Far-End signal; and FIG. 3 is a graph showing the frequency response of a second filter of the double talk detection system of FIG. 1, superimposed on the frequency spectrum of a Near-End signal.

DETAILED DESCRIPTION OF THE PREFERRED EMBODIMENT

Referring now to FIG. 1, there is shown a block diagram of a communication terminal 10, such as a conference telephone. The communication terminal 10 is configured to provide two-way audio communication between a Near-End speaker 8 and a Far-End speaker (not shown). A Far-End signal x(t) is supplied to an input terminal 12 in analog form via a traditional telephone subscriber line. An analog-to-digital converter, ADC 14, is connected to receive the Far-End signal x(t) from the input terminal 12 and to convert the Far-End signal x(t) into a digital signal x(k). The digital signal x(k) is provided by ADC 14 along signal line 16.

The signal x(k) is supplied by signal line 16 to an input terminal of a removal filter 18. The removal filter 18 is configured to remove a selected audio component from the digital Far-End signal x(k). In a preferred embodiment, the removal filter 18 comprises a wideband lowpass filter for substantially eliminating a range of frequency components of x(k) above a selected frequency. Referring to FIG. 2, there is shown a preferred frequency response characteristic 20 for the removal filter 18. Also shown in FIG. 2 is a typical frequency spectrum 22 of a speech signal, such as may be received by the communication terminal 10. As shown in FIG. 2, the speech spectrum 22 includes a range of frequency components, including components above 4,000 Hz.

The frequency response characteristic 20 of removal filter 18 is designed to substantially attenuate, or reject, a range of frequency components of the speech spectrum 22 above a selected cutoff frequency. For typical speech signals, it has been found that removing components above about 3750 Hz, or in a range from 3750 Hz to 4000 Hz does not significantly degrade the perceived quality of the speech.

In other embodiments, the filter characteristic 20 can be configured to remove signal components within any selected range of frequencies that is normally present in a speech signal. It is preferable to remove relatively high frequency components because of the logarithmic relationship between audio frequency and human pitch perception. At relatively high frequency ranges, for example above about 3000 Hz, larger ranges of frequency components can be removed from a speech signal without affecting the perceived sound quality than at relatively lower ranges of frequencies.

Referring again to FIG. 1, the removal filter 18 provides a filtered signal x(k)' upon signal line 20. A digital-to-analog converter 22 is connected to signal line 20 to receive and convert digital signal x(k)' to an analog signal x(t)'. The analog signal x(t)' is then provided to a loudspeaker 24 for audible transmission to the Near-End speaker 8.

Microphone 30 is located at the near end for receiving and converting the Near-End speaker's audible speech 26 into an analog electronic signal y(t). The microphone signal y(t) also includes an echo component because of the echo path 28 between the loudspeaker 24 and the microphone 30. An analog-to-digital converter 32 is connected to receive the microphone signal y(t), to convert y(t) into a digital signal y(k), and to provide the digital signal y(k) along signal line 34.

A summing junction 36 is connected to receive y(k) from signal line 34. The summing junction 36 is further connected to receive an estimated echo signal e(k) from an AFIR filter 38. At the summing junction 36, the estimated echo signal e(k) is subtracted from the digital Near-End signal y(k) to provide an echo-canceled signal y(k)' along signal line 40. Further processing may be performed on the signal y(k)', such as residual echo attenuation and comfort noise injection as are commonly performed in connection with echo cancellation. A digital-to-analog converter, DAC 42, is connected to signal line 40 for converting the echo-canceled signal y(k)' into an analog signal y(t)', and for providing y(t)' at an output terminal 44 for transmission to the Far-End, such as by the previously mentioned telephone subscriber line.

The AFIR filter 38 generates the estimated echo signal e(k) by convolving the received Far-End signal with an estimated echo path impulse response determined by internal coefficient values. The AFIR filter 38 is connected to signal line 20 to receive the Far-End signal x(k)' from which the selected signal component has been removed by the removal filter 18. The AFIR filter 38 is further connected with signal line 40 to receive the echo-canceled signal y(k)'. The AFIR filter 38 executes a normalized least-mean-square (NLMS) procedure to adapt the internal coefficients in a manner that minimizes y(k)'. In order to obtain internal coefficients that accurately model the actual echo signal 28, such adaptation procedure is preferably performed when the Near-End speech signal 26 is substantially absent from the microphone signal.

Detection filter 48 is connected to receive the digitized microphone signal y(k). Detection filter 48 is further connected with a decision stage 54', which is configured to produce an adaptation control signal on control terminal 46 when the presence of a Near-End speech signal is detected within the microphone signal y(k). The detection filter 48 comprises a filter for responding to the presence, within the microphone signal y(k), of a signal component corresponding to the signal component removed from the Far-End signal by the removal filter 18.

Referring to FIG. 3, the detection filter (48) is preferably configured to operate according to frequency response characteristic 52. The filter frequency response characteristic 52 is selected to substantially attenuate frequencies outside of a selected frequency range that coincides with the range of frequencies attenuated by the removal filter 18. In the present embodiment, the detection filter 48 includes a bandpass filter for detecting the presence of signal components within a range of frequency from about 3750 Hz to 4000 Hz. The detection filter 48 may further include an averaging filter for producing an average of the signal level in the passband over a time interval commensurate with the adaption interval of the AFIR filter 38.

The detection filter 48 is connected to a decision stage 54 for receiving the filtered microphone signal and for producing the adaptation control signal in response to the filtered microphone signal having a non-zero value, or a value above a selected sensitivity threshold. Because the detection filter 48 is arranged to detect the presence of microphone signal components corresponding the signal components that were removed from the Far-End signal, then detection of such microphone signal components is presumably due to audio activity originating at the near end. In the present example as shown in FIG. 3, the presence of signal activity within the range of 3750 Hz to 4000 Hz will cause the decision stage 54 to issue the adaptation control signal at terminal 46. The AFIR filter 38 will respond to the control signal by discontinuing to adapt the internal coefficient values.

The terms and expressions which have been employed are used as terms of description and not of limitation. There is no intention in the use of such terms and expressions of excluding any equivalents of the features shown and described or portions thereof. It is recognized, however, that various modifications are possible within the scope of the invention as claimed. For example, while removal filter 18 has been described as a distinct component, it is noted that analog-to-digital converters, such as ADC 14, commonly comprise low-pass filters for anti-aliasing. Hence, removal filter 18 may be omitted as a distinct component setting an appropriate cutoff frequency for the anti-aliasing filter of ADC 14.

Additionally, while the present technique has been described in connection with a teleconferencing terminal, the principles of the invention are generally applicable to any two-way telecommunication system wherein it would be desirable to determine whether a signal traveling in one direction comprises a signal component generated exclusively at one end of the communication path. For example, the AFIR 38, removal filter 18, detection filter 48, summing junction 36, and decision stage 54, which are collectively designated as FIG. 1 as echo canceler 60, may desirably be deployed in a digital telecommunication system for eliminating hybrid echo. It should also be appreciated that various functional components of the invention may be implemented as analog-electric circuits, application-specific circuits, or preferably, as one or more appropriately-programmed digital signal processing integrated circuits.

That which is claimed is:

1. An apparatus for detecting Near-End audio activity in a two-way telecommunication system connected between a Near-End and a Far-End, the apparatus comprising:

a first input terminal for receiving a first telecommunication signal from the Far-End;

a removal filter connected with the first input terminal for removing a selected signal component from the first telecommunication signal and thereby preventing audio reproduction of the selected signal component at the Near-End;

a second input terminal for receiving a second telecommunication signal from the Near-End;

a detection filter connected with the second input terminal and configured for detecting the presence of a component of the second telecommunication signal that corresponds with the component removed from the first telecommunication signal; and a decision stage connected with the detection filter and responsive thereto for generating a control signal indicating the presence of audio signals generated at the Near-End when the signal component is detected.

2. The apparatus of claim 1 wherein the removal filter comprises a filter for removing a range of frequency components from the Far-End signal.

3. The apparatus of claim 2 wherein the selected range of frequencies is above about 3,000 Hz.

4. The apparatus of claim 3 wherein the selected range of frequencies is limited to a range between 3,750 Hz and 4,000 Hz.

5. The apparatus of claim 3 comprising an analog-to-digital converter connected with said first input terminal and the removal filter comprises an anti-aliasing filter in said analog-to-digital converter.

6. The apparatus of claim 2 wherein the detection filter comprises a bandpass filter having a bandwidth that corresponds to the range of frequency components.

7. The apparatus of claim 6 wherein the decision stage is responsive to a predetermined threshold of signal activity detected by the bandpass filter.

8. An echo canceler, comprising:

a first input terminal for receiving a first telecommunication signal from a Far-End;

a removal filter connected with the first input terminal for removing a selected signal component from the first telecommunication signal;

a second input terminal for receiving a second telecommunication signal from the Near-End;

a detection filter connected with the second input terminal and configured for detecting the presence of a signal component of the second telecommunication signal that corresponds with the component removed from the first telecommunication signal;

a decision stage connected with the detection filter and responsive thereto for generating a control signal when the signal component is detected;

an adaptive filter connected to receive the first telecommunication signal and configured for producing an estimated echo signal on the basis of internal coefficient values, the adaptive filter having adaptation means responsive to the control signal for adapting the internal coefficient values;

summing means for removing the estimated echo signal from the second telecommunication signal.

9. The apparatus of claim 8 wherein the removal filter comprises a filter for removing a range of frequency components from the first telecommunication signal.

10. The apparatus of claim 9 wherein the range of frequencies is above about 3,000 Hz.

11. The apparatus of claim 10 wherein the range of frequencies is between 3,750 Hz and 4,000 Hz.

12. The apparatus of claim 8 wherein the detection filter comprises a bandpass filter having a bandwidth that corresponds to the range of frequency components.

13. The apparatus of claim 12 wherein the decision stage is responsive to a predetermined threshold of signal activity detected by the bandpass filter.

14. A teleconferencing terminal for providing full duplex communication between a Near-End speaker at a Near-End and a Far-End speaker at a Far-End, comprising:

a first input terminal for receiving a Far-End telecommunication signal from the Far-End;

a removal filter connected with the first input terminal for removing a signal component from the Far-End telecommunication signal, whereby a filtered Far-End signal is provided;

a loudspeaker connected with the removal filter for providing the filtered Far-End signal in audible form to the Near-End speaker;

a microphone for receiving an audible signal from the Near-End speaker, whereby a Near-End signal is provided;

a detection filter connected with the microphone and configured for detecting a signal component of the Near-End signal that corresponds with the component removed from the Far-End signal;

a decision stage responsively connected with the detection filter for generating a control signal when the signal component is detected;

an adaptive filter connected to receive the Far-End signal and configured for producing an estimated echo signal on the basis of internal coefficient values, the adaptive filter having adaptation means responsive to the control signal for adapting the internal coefficient values;

summing means for removing the estimated echo signal from the Near-End signal, whereby an echo-canceled signal is provided; and an output terminal connected with the summing means for transmitting the echo-canceled signal to the Far-End.

15. The apparatus of claim 14 wherein the removal filter comprises a filter for removing a selected range of frequencies from the Far-End signal.

16. The apparatus of claim 15 wherein the selected range of frequencies is above about 3,000 Hz.

17. The apparatus of claim 16 wherein the selected range of frequencies is between 3,750 Hz and 4,000 Hz.

18. The apparatus of claim 14 comprising an analog-to-digital converter, wherein the removal filter comprises an anti-aliasing filter in the analog-to-digital converter.

19. The apparatus of claim 14 wherein the detection filter comprises a bandpass filter for responding to signal activity within the selected range of frequency components.

20. The apparatus of claim 19 wherein the decision stage is response to a predetermined threshold of signal activity detected by the bandpass filter.

* * * * *